3 Sheets--Sheet 1.
J. E. CRANE.
Beater for Cotton-Openers.
No. 161,868. Patented April 13, 1875.
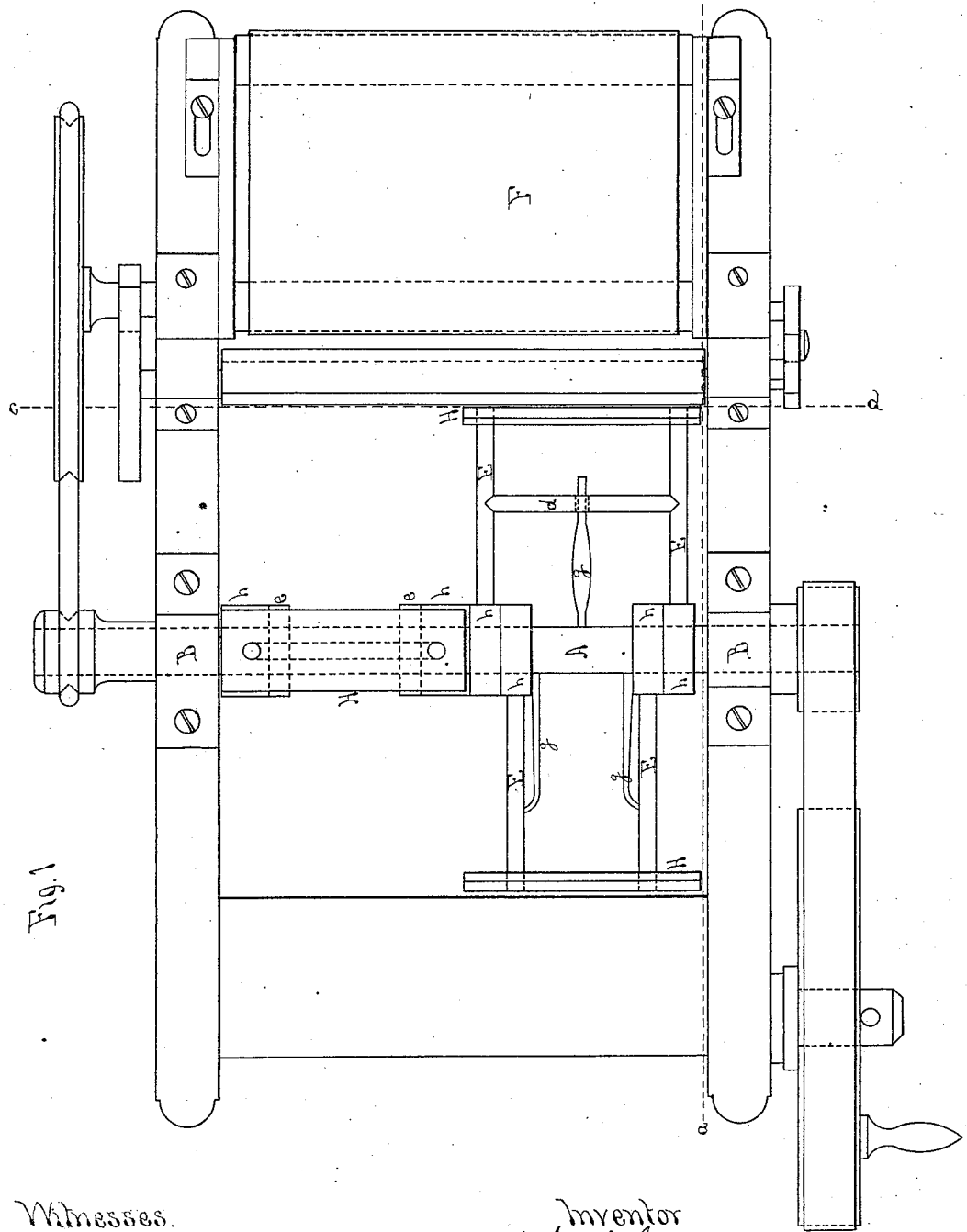
Witnesses.
Wm. S. Brown
Nathan Brown
Inventor
John E Crane

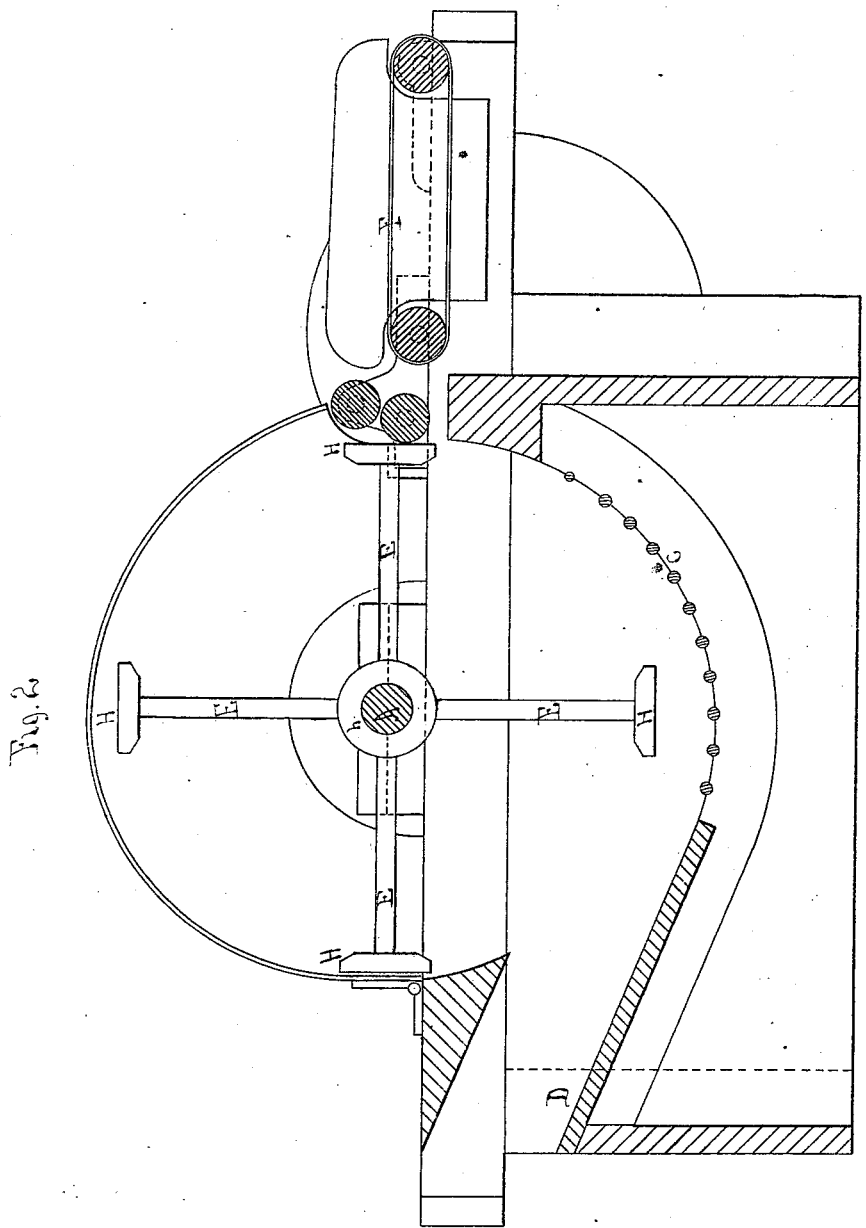

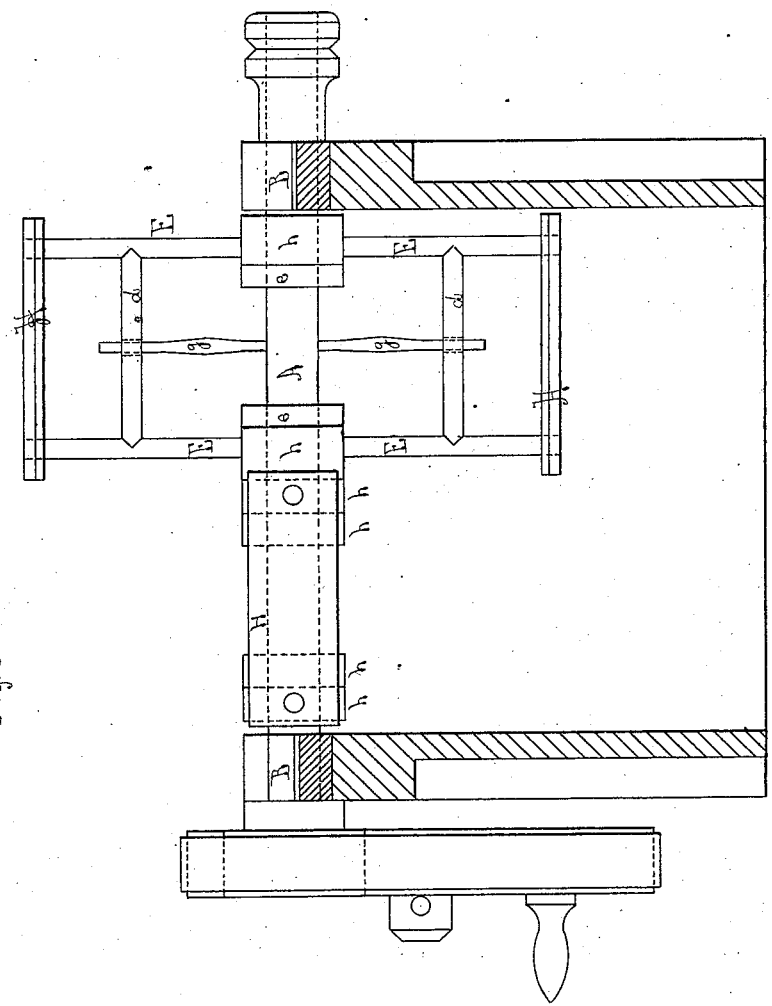

UNITED STATES PATENT OFFICE.

JOHN E. CRANE, OF LOWELL, MASSACHUSETTS.

IMPROVEMENT IN BEATERS FOR COTTON-OPENERS.

Specification forming part of Letters Patent No. 161,868, dated April 13, 1875; application filed May 11, 1874.

*To all whom it may concern:*

Be it known that I, JOHN E. CRANE, of Lowell, in the county of Middlesex and State of Massachusetts, have invented certain new and useful Improvements in Cotton-Openers, of which the following is a full, clear, and exact description, reference being had to the accompanying drawings, making part of this specification.

This invention relates to yielding beaters for cotton-openers; and consists in such an arrangement of said beaters with relation to the shaft on which they are revolved that, when the beaters yield to any hard substance, which they may strike, passing between the feed-rolls, they remain in the arc of the circle which they traverse in their rotation, and still pass by the feed-rolls and grate-bars, beneath the beater, at the same distance therefrom as if rigid.

Figure 1 is a plan or top view of my improvement with the beater-bonnet removed. Figs. 2 and 3 are each sectional elevations of the same on the lines *a b* and *c d*, respectively.

Heretofore yielding beaters of cotton-openers have been hinged to projections or lugs attached to the shaft by which they were revolved, and the axis on which they yield to obstruction in their path, when rotated, is thus nearer the beater-blade than their axis of rotation. The effect of this construction is to cause the beater in yielding to fall back in the arc of a circle of less diameter than the arc of its rotation, and to thereby draw away toward its axis of rotation from the feed-rolls and dirt-bars or screen beneath, thus allowing masses of mingled dirt and cotton of greater or less size to escape past the beater. To avoid these difficulties and increase the opening and cleaning capacity of the yielding beater upon the cotton I make the axis upon which the beater yields substantially coincide with its axis of rotation, so that, as it gives way to any hard substance, it does not draw away from the feed-rolls and dirt-screen bars beneath, but keeps at the same distance from them in its subsequent rotation, and bunches of uncleaned cotton cannot escape past the beater and avoid its operation.

In the said drawings, A represents the central or main shaft, having journals B supported and revolving in bearings on the frame, cased up in the usual way, and provided with a common screen or rack, C, beneath the shaft and the beaters thereon, a delivery trunk or spout, D, a common feed-apron, F, and well-known feed connecting and operating mechanism, which may be driven from a pulley on one end of the main shaft, as shown. To the shaft A I apply certain loosely-fitting hubs *h*, which encircle the shaft, and to each of said hubs, at one or both sides thereof, I apply and secure an arm or arms, E, and to the outer ends of such arms a beater-blade, H, well fastened to two of the arms. At some convenient point or points between each pair of arms I apply a spring or springs, *g*, to the shaft A, where such spring or springs are suitably secured, and project outward parallel or nearly so to the arm or arms. The outer end portion of the spring or springs is loosely connected to said arm or arms, or to a cross-bar, *d*, extending from one arm to another, as shown. The spring or springs *g* retain the arms and the blades in one position, radially, and allow the blades to yield or fall back when, in their rapid revolution, such spring-held and arm-connected blades strike the cotton fed to them more or less in bunches, or in a matted condition. Each pair of hubs *h* on the shaft A may have a single pair of arms, E, projecting from one side of each hub, as shown in Fig. 1, and from a second pair of hubs inside or outside of the other hubs a second pair of arms project, and each pair of arms is provided with a blade, H. The different pairs of hubs and arms and their connected blades are independent of each other, and when, in operation, one blade strikes the fed cotton such blade will yield independently of the opposite blade, which, in its turn, will yield in like manner, each blade striking the cotton and yielding successively as it revolves. Each pair of hubs *h* on the shaft A may have two pairs of arms, E, each pair of arms projecting outward on opposite sides of such hubs, and provided with blades H, springs *g*, and cross-bars *d*, as shown in Fig. 3, the outer end of each spring passing through and working in a slot or opening in the cross-bar, both springs being operative when either blade strikes the fed cotton; and if either spring is disabled the other spring will operate alone until another spring can be applied in place of that disabled. By constructing the aforesaid beaters with blades, hubs, and a spring or springs, or with one or more springs and a cross-bar, d, and by hinging said beaters by their loosely-fitting hubs to the central shaft A, as a hinging-rod, their length from their hinging centers to their operating ends or blades will be in excess of beaters hinged to or beyond the periphery of the shaft, and such excess of length of said beaters gives them some advantage in striking or in operating upon cotton over beaters of shorter leverage. The longer the hinged beater from its center of pivoting to its operating end the more forcibly will be the blow imparted by the blade of such beaters when revolving, and, therefore, this machine will be very potent and effectual for opening cotton in bunches or in a matted condition. Instead of the radial spring or springs g for holding the beaters in position, and for causing them to yield, as described, spiral springs or rubber springs may be substituted by using a hollow hub, h, fitting loosely on the shaft A, and containing the spring, connected and held by a hub, flange, or collar, e, secured to the shaft, and operated by the loosely-fitting hubs and the arms and blades when the latter revolve and strike the fed cotton. It will be understood that the action of the beaters hinged in this new and improved manner to and around the central shaft, as herein shown and described, will be different from the action of beaters hinged to or beyond the periphery of the shaft. When the last-named beaters yield to their blows their operating ends or blades fall back or away from the feed-rolls, leaving opportunities for bunches of cotton to pass between the feed-rolls and the fallen back beater; but when the first-named beaters or the beaters herein described yield to their blows the blades react as soon as they strike the fed cotton and again come forward in the same circular line, and always maintain the same distance from the feed-rolls and rack C; but these beaters yield sufficiently to relieve them when they strike bunches of cotton or cotton in a matted condition; and, by this construction and their great length of leverage from their hinging center to the operating ends, these beaters will do greater execution in opening cotton than most other hinged beaters for cotton-openers. Cotton struck by these said beaters will be carried forward and opened by them as such cotton passes the feed-rolls, and no cotton will pass the beaters without being acted upon by them.

I claim as my invention—

The yielding cotton-beater, combined with the shaft A, as an axis of rotation and an axis upon which the beater is made to yield, substantially as described.

JOHN E. CRANE.

Witnesses:
WM. S. BROWN,
NATHAN BROWN.